United States Patent

[19]

Rice

[11] Patent Number: 5,954,903
[45] Date of Patent: Sep. 21, 1999

[54] BRANCHED SEWER RE-LINING

[76] Inventor: Nigel Leonard Rice, Epworth Grange, Beltott Road, Epworth, Doncaster, DN9 1JD, United Kingdom

[21] Appl. No.: 08/945,538
[22] PCT Filed: Apr. 9, 1996
[86] PCT No.: PCT/GB96/00852
§ 371 Date: Dec. 29, 1997
§ 102(e) Date: Dec. 29, 1997
[87] PCT Pub. No.: WO96/31727
PCT Pub. Date: Oct. 10, 1996

[30] Foreign Application Priority Data

Apr. 5, 1995 [GB] United Kingdom ............ 9507003

[51] Int. Cl.$^6$ ................ B29C 63/28; B29C 63/36
[52] U.S. Cl. ................. 156/156; 156/212; 156/252; 156/287; 156/294
[58] Field of Search ................. 156/156, 252, 156/267, 287, 294, 212, 214; 138/97, 98; 264/269, 516, 573

[56] References Cited

U.S. PATENT DOCUMENTS

| 4,009,063 | 2/1977 | Wood | 156/294 |
|---|---|---|---|
| 4,600,615 | 7/1986 | Hyodo et al. | 138/97 |
| 4,630,676 | 12/1986 | Long | 166/55 |
| 4,648,454 | 3/1987 | Yarnell | 166/297 |
| 4,685,983 | 8/1987 | Long | 156/294 |
| 4,778,553 | 10/1988 | Wood | 156/294 |
| 5,108,533 | 4/1992 | Long et al. | 156/294 |
| 5,356,502 | 10/1994 | Kamiyama et al. | 156/294 |
| 5,609,439 | 3/1997 | Schreiner et al. | 156/156 |

FOREIGN PATENT DOCUMENTS

| 0 253 588 A1 | 1/1988 | European Pat. Off. . | |
| 0 241 719 B1 | 7/1991 | European Pat. Off. . | |
| 0 610 620 A1 | 8/1994 | European Pat. Off. . | |
| 3929558 A1 | 3/1991 | Germany . | |
| 63-286326 | 11/1988 | Japan | 156/294 |
| 2147966 | 5/1985 | United Kingdom . | |

*Primary Examiner*—Steven D. Maki
*Attorney, Agent, or Firm*—Workman, Nydegger & Seeley

[57] ABSTRACT

A method of re-lining a main pipeline having at least one transversely extending pipe connected thereto via a generally annular connection region includes applying an internal lining to the inner wall of a length of the main pipeline and which overlies the entrance to the transversely extending pipe. A hole is then formed in the lining so as to expose the entrance. A re-lining assembly is introduced into the pipe from an end thereof remote from the entrance, the assembly comprising a tubular web of resin-permeated material within an elastomeric membrane which is everted by application of fluid pressure to the assembly so as to introduce the assembly into the pipe and so that the now externally located tubular web projects into the main pipeline. Fluid pressure is further applied to the assembly so that the membrane causes the projecting end of the tubular web to flare or deform outwardly and thereby overlie the connection region. Inflating a packer which is located in the main pipeline adjacent to the transversely extending pipe engages with the flared projecting end of the tubular web to press the end into engagement with the portion of the wall of the main pipeline adjacent to the connection region.

10 Claims, 1 Drawing Sheet

BRANCHED SEWER RE-LINING

This invention relates to the re-lining of a sewer having a main line and at least one transverse connecting line or "lateral".

The invention is particularly applicable to the renovation of sewers and other buried pipelines, but it should be understood that it has a general application to the renovation, by re-lining, of pipelines of many different types, provided that such pipelines have one or more transversely extending connecting lines.

There are a number of methods used for the renovation of sewers and other buried pipelines, without the need for excavation, and one such method involves the insertion of resin-impregnated material into a sewer line and application of the material to the wall of the line. After a period of time, the resin cures and thereby forms an inner lining on the inner face of the sewer line which is required to be renovated.

This method is known by the generic term "cured in place pipe", and has been used successfully for a number of years for certain applications. However, there is the disadvantage that the material tends to wrinkle when the lining is formed around bends in a pipeline, and which can result in an inadequate lining layer being formed at such locations which is clearly undesirable as this will be a region of weakness and potentially inadequate sealing and which will reduce significantly the useful working life of the apparently renovated pipeline.

There is a further problem with this existing method when the material is required to be introduced into pipes of relatively small diameter, typically of diameter less than 150 mm. This problem arises by reason of the normal technique which is used in order to introduce the resin-impregnated material into the pipe, namely a technique known in the industry as "everting". This will be well-known to those of ordinary skill in the art, and therefore will not be described in detail herein. Briefly, the technique of "everting" allows for installation of a tubular re-lining layer from one end of a pipeline, and with the layer turning itself inside out as it is introduced into the pipeline under the action of a fluid actuation pressure. This technique is particularly suitable when dealing with the re-lining of "laterals" i.e. transversely extending connecting pipes running into a main sewer line, and where access is restricted.

Evidently, the connecting region between a lateral and a main line is a critical region when re-lining of the main line and of the lateral is taking place, and which is difficult to re-line and seal adequately using existing techniques.

The present invention has therefore been developed primarily with a view to addressing this problem, and to provide a unique method and system by which to solve the problem.

According to the invention there is provided a method of re-lining a main pipeline having at least one transversely extending pipe connected thereto via a generally annular connection region, said method comprising applying an internal lining to the inner wall of a length of said main pipeline and which overlies the entrance to said transversely extending pipe and also said connection region, and forming a hole in the lining so as to expose said entrance; introducing a re-lining assembly into said pipe from an end thereof remote from said entrance, said assembly comprising a tubular web of resin-permeated material within an elastomeric membrane which is everted by application of fluid pressure to the assembly so as to introduce the assembly into the pipe and so that the now externally located tubular web projects into the main pipeline; applying further fluid pressure to the assembly so that the membrane causes the projecting end of the tubular web to flare or deform outwardly and thereby overlie the connection region; and inflating a packer which is located in the main pipeline adjacent to the transversely extending pipe to engage with said flared projecting end of the tubular web and to press said end into engagement with the portion of the wall of the main pipeline adjacent to said connection region, whereby the resin impregnated in the web is caused or allowed to cure and thereby to bond the web to the lining of the main pipeline.

The membrane may be removed, or if desired and with suitable pre-treatment, may bond itself to the tubular web to complete the re-lining of the transversely extending connecting pipe.

Preferably, the main pipeline is re-lined using a resin-impregnated matt, whereby the resin of the main pipeline re-liner can bond to the resin of the re-lining of the transversely extending connecting pipe upon curing.

Preferably, the resin-impregnated tubular web is a woven or knitted fabric made of glass or other suitable reinforcing material, and which is drawn inside a waterproof elastomeric membrane, impregnated with resin, and then everted into position. The knitted material conforms around bends, and with the application of suitable tension during manufacture, has a tendency for the end to roll back upon itself when formed into a circle. This roll is utilised in the second stage where sealing is required at the annular connection point between the connecting pipe (lateral) and the main pipeline.

Where the lateral connects into the main pipeline, the main run of pipeline is first re-lined using any existing re-lining technique, and the resin incorporated in the lining is then allowed to cure. A connection hole to gain access to the lateral is then desirably formed by cutting, using a robotic cutting machine or other suitable method. A closed circuit television camera (CCTV) is placed inside the main run and observes the connection hole. The tubular membrane of the assembly introduced into the lateral is everted into the lateral until it is observed by the CCTV to enter the main run. The precise length can then be measured.

An inflatable packer is installed in the main run at a location adjacent to the entrance to the lateral, and lies flat below the area of the connection point.

The elastomeric membrane and the knitted tubular web is prepared, resin impregnated and everted into position by the use of a fluid. With pre-measurement and observation by CCTV, the membrane can be observed to enter the main run together with a slight protrusion of the knitted material. At this juncture, the membrane is prevented from everting further, and pressure is increased until it balloons slightly, forcing the knitted material to flare out and cause a slight roll. The subsequent inflation of the packer presses this material against the wall of the re-lined main pipeline, and provided the resins of the relined main pipe line and of the lateral are compatible, molecular bonding is achieved at this connection point.

When the resins have fully cured, the membrane may be removed, or with suitable pre-treatment, be bonded to the knitted material and left in place.

One example of a sewer re-lining method according to the invention will now be described with reference to the accompanying schematic drawing, in which.

Figure 1:
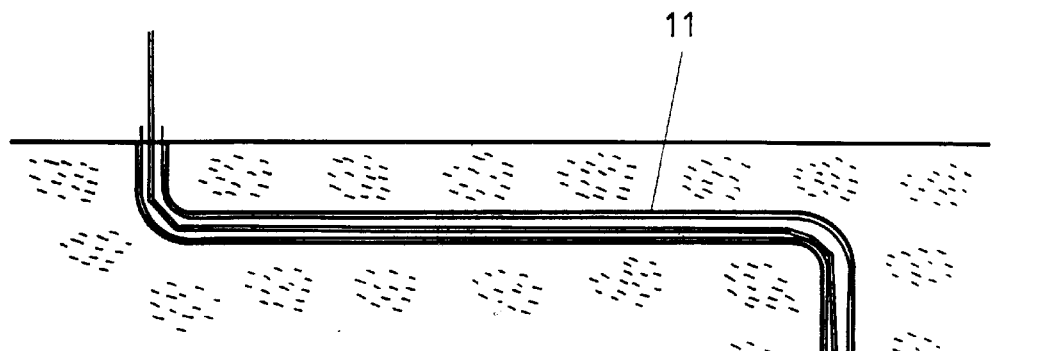
FIG. 1 is a cross-section of a transversely extending connecting pipe or "lateral" feeding into a main sewer line, and both of which are assumed to be required to be re-lined by a method according to the invention.

First of all, an internal lining 10a is applied to the inner wall of a length of the main pipeline 10, and which can be carried out using any existing re-lining technique involving the use of a curable resin. This internal lining overlies the entrance to a lateral 11, and also the connection region 12, but a hole is then formed in the lining so as to expose the entrance by any suitable means, preferably by use of a robotic cutting machine or other suitable method, in combination with a close circuit television camera placed inside the main run and observing the connection hole.

A re-lining assembly (14, 15) is formed with which to re-line the lateral 11, and which comprises a tubular web 14 of resin-permeated material, preferably of woven or knitted glass, or other reinforcing material, and which fits initially internally of an elastomeric membrane 15.

To introduce the assembly into the lateral from the end remote from the entrance, the known technique of "everting" is utilised, by the application of fluid pressure to the assembly, and which introduces the assembly into the lateral 11 and so that the now externally located tubular web projects into the main line by an observed amount. At this point, the membrane is prevented from everting further, and the pressure is increased until the membrane balloons slightly, forcing the knitted material at the projecting end to flare out and form a slight roll, as can be seen from the first stage shown in FIG. 2. This shows the flared and curled end 13 formed at the inner projecting end of the tubular resin impregnated web 14, and also shows the now internally located membrane 15. This flaring of the inner projecting end 13 causes it to overlie or at least lie along side the connection region 12, as can be seen from FIG. 2.

Figure 2:
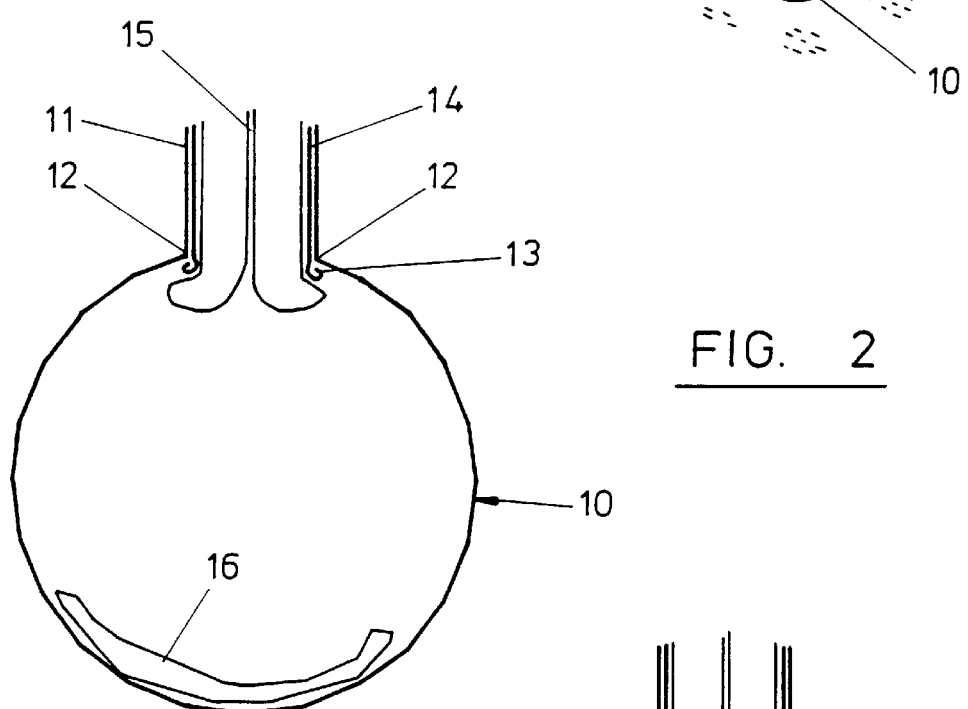
FIG. 2 is an enlarged view of a first stage of renovating the lateral by applying a lining to it which, upon curing, can bond reliably to a lining formed previously in the main pipeline to which it is connected.

As can be seen also from FIG. 2, an inflatable packer 16 is located in the main pipeline 10 adjacent to the entrance to the lateral 11, and upon inflation it can engage with the flared projecting end 13 of the tubular web 14 to press this end into engagement with the portion of the wall of the main line 10 adjacent to the connection region 12. Thereby, the resin impregnated in the web 14 is caused or allowed to cure and thereby bond the web to the lining of the main pipeline 10, while at the same time bonding the web 14 to the inner wall of the lateral 11.

Figure 3:
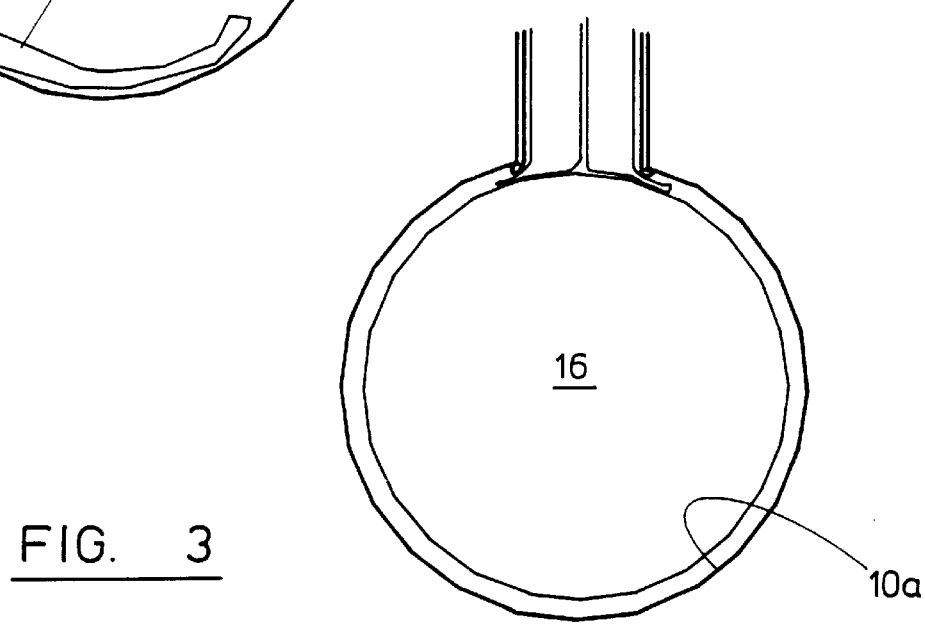
FIG. 3 is a further stage in the formation and uniting of the lining of the lateral to the lining of the main pipeline.

This further stage of simultaneous formation of the re-lining of the lateral 11, with bonding to the previously formed liner of the main pipeline 10 is shown in FIG. 3.

The membrane 15 may be removed after completion of the operation. Alternatively, if desired, and with suitable pre-treatment of the membrane, it may bond itself to the tubular web 14 to complete the re-lining of the transverse connecting pipe or lateral 11.

The main pipeline 10 is preferably re-lined with a resin impregnated matt, and desirably by making the resins of the main and lateral re-linings to be compatible, molecular bonding is achieved at the connection point 12, which is a critical region which is particularly difficult to re-line and seal satisfactorily using existing techniques.

I claim:

1. A method of re-lining a first pipeline connecting to a second pipeline via a generally annular connection region, the method comprising:

(a) everting a re-lining assembly into the first pipeline by application of fluid pressure such that a tubular web of the re-lining assembly impregnated with a resin is adjacently disposed along a length of the first pipeline and a free end of the tubular web projects into the second pipeline adjacent to the connection region;

(b) applying further fluid pressure to the re-lining assembly such that an elastomeric membrane of the re-lining assembly, centrally disposed within the tubular web, causes the end of the tubular web projecting into the second pipeline to radially outwardly flare and roll back towards itself so as to overlie a portion of the second pipeline adjacent to the connection region;

(c) inflating a packer positioned within the second pipeline so as to press the flared projecting end of the tubular web against a portion of the wall of the second pipeline adjacent to the connection region; and (d) allowing the resin impregnated in the web to cure so as to bond the web to a lining on the wall of the second pipeline.

2. A method as recited in claim 1, further comprising the step of removing the elastomeric membrane from within the tubular web.

3. A method as recited in claim 1, further comprising the step of re-lining the second pipeline with a resin impregnated tubular web prior to re-lining the first pipeline to form the lining on the wall of the second pipeline.

4. A method of re-lining a main pipeline having at least one transversely extending pipe connected thereto via a generally annular connection region, said method comprising applying an internal lining to the inner wall of a length of said main pipeline and which overlies the entrance to said transversely extending pipe and also said connection region, and forming a hole in the lining so as to expose said entrance; introducing a re-lining assembly into said pipe from an end thereof remote from said entrance, said assembly comprising a tubular web of resin-impregnated material within an elastomeric membrane, the end of the tubular web being configured to roll back upon itself when formed into a circle, the tubular web being everted by application of fluid pressure to the assembly so as to introduce the assembly into the pipe and so that the tubular web is externally located and projects into the main pipeline; preventing the elastomeric membrane from everting further; applying further fluid pressure to the assembly so that the membrane causes the projecting end of the tubular web to flare or deform outwardly and to roll back towards itself and thereby overlie the connection region; and inflating a packer which is located in the main pipeline adjacent to the transversely extending pipe to engage with said flared projecting end of the tubular web and to press said end into engagement with the portion of the wall of the main pipeline adjacent to said connection region, and causing or allowing the resin impregnated in the web to cure and thereby to bond the web to the lining on the main pipeline.

5. A method according to claim 4 further comprising the step of removing the membrane from the assembly after the resin impregnated in the web has cured.

6. A method according to claim 4, in which the membrane is pre-treated, with a bonding agent, and is caused to bond itself to the tubular web to complete the re-lining of the transversely extending connecting pipe.

7. A method according to claim 4, in which the internal lining comprises a resin-impregnated matt, whereby the resin of the internal lining can bond to the resin of the tubular web upon curing.

8. A method according to claim 4, in which the hole formed in the lining on the main pipeline is formed by cutting using a robotic cutting machine in cooperation with a closed circuit television camera placed inside the main pipeline and arranged to observe the connection hole.

9. A method according to claim 8, in which the tubular membrane of the assembly introduced into the transversely extending pipe is everted into the pipe until it is observed by the closed circuit television camera to enter the main pipeline.

10. A method according to claim 4, in which the inflatable packer is installed in the main pipeline at a location adjacent to the entrance to the pipe, and initially lies flat opposite the area of the connection region.

* * * * *